Nov. 13, 1928.

J. C. ANDERSON 1,691,507

WOVEN WIRE FABRIC AND METHOD OF MAKING IT

Filed Jan. 28, 1925

Witness:
S. S. Grotta

Inventor:
John C. Anderson
by W. N. Howson
Att'y.

Patented Nov. 13, 1928.

1,691,507

UNITED STATES PATENT OFFICE.

JOHN C. ANDERSON, OF KEYPORT, NEW JERSEY.

WOVEN-WIRE FABRIC AND METHOD OF MAKING IT.

Application filed January 28, 1925. Serial No. 5,281.

My invention relates to woven wire fabrics and it has special reference to fabrics that are designed for use as conveyor belts.

One object of my invention is to provide a sectional woven wire fabric having straight side edges and so constructed that when made into an endless traveling belt it will be free from any tendency to creep laterally upon the rollers or other supports which carry the belt. I accomplish this object by making the belt in sections composed alternately of right-hand coils and left-hand coils, and by joining the sections in a novel manner, so that the edges of all of the sections are in alinement.

Another object of my invention is to provide an effective method for joining right and left sections of woven wire fabric of the character mentioned above, in such a way as not only to produce a straight-sided fabric, but also to join the sections without materially altering the character of the fabric at the seam.

In woven wire material which is composed of interengaging helixes of wire, the loops of the wire join with one another to form diagonal surface ribs. When such a fabric is made into a conveyor belt the diagonal ribs give the belt a marked tendency to creep laterally upon its supports.

Attempts have been made to overcome the creeping tendency of woven wire conveyor belts by making the belt in sections which are alternately woven from right-handed helixes and left-handed helixes, so as to cause the surface ribs of the alternate sections to extend in different directions. While this arrangement overcomes the creeping tendency, the sectional belts heretofore produced have not been satisfactory, because the edges of the sections have been offset or staggered, producing irregular and broken edges which are likely to strike projections of various kinds when the belt is in use, resulting in destroying or in seriously damaging the belt.

The usual method of joining the sections of a right and left-hand belt of this kind has been to insert a straight wire through the overlapping meshes formed by bringing the edges of right and left sections together. This necessarily causes the sections to be offset at the joints, which produces the defects stated above. Furthermore, the straight-wire method of joining woven-wire sections has several practical objections, among which are that the overlapping of the meshes requires more material and labor for a given number of linear feet of belt, as the extra wire consumed at the joints is useless; also, that the uniform mesh of the belt is interrupted and altered at the joints, destroying the utility of that portion of the belt in cases where the character of the mesh is of importance to the operation of the belt; further, that the flexibility of the belt is greatly reduced at the joints because of the necessary rigidity of the straight-wire method of joining the sections, and this interferes with proper adherence of the belt to the pulleys over which it travels. Another objection to the straight-wire method is that the straight joining wire is subjected to a continual sawing motion from both of the adjacent sections, such sawing motion being exerted directly across the joining wire and being increased by the rigidity of the joint, thereby causing the connecting wires to wear through long before the belt itself has worn appreciably.

According to my present invention, I overcome all of the defects pointed out above by the use of a novel method of connecting right and left woven sections of wire fabric. This method consists in providing a joining wire which is bent in a succession of loops. The loops on one side of the bent connecting wire are shaped to engage only right-hand wound spirals, and the remaining alternate loops on the other side of the connecting wire, are arranged to engage only left-hand wound spirals. The joining is accomplished by laying the right and left-hand sections on opposite sides of the connecting wire, making sure that the proper side of the connecting wire is turned toward each section, then on one side weaving into the right-hand section and the connecting wire simultaneously, a right-hand coil exactly like the other right-hand coils composing this section. This operation is duplicated on the other side of the connecting wire with a left-hand coil exactly similar to the other coils of the left-hand section, and the edges of the fabric at the joint are finished by bending over the ends of the connecting wires in the same manner as those of the belt proper.

In the accompanying drawings, Figure 1 is a plan view, showing a portion of a sectional fabric constructed in accordance with my invention;

Fig. 4 is a fragmentary section on the line 4—4, Fig 1; and

Figure 2:
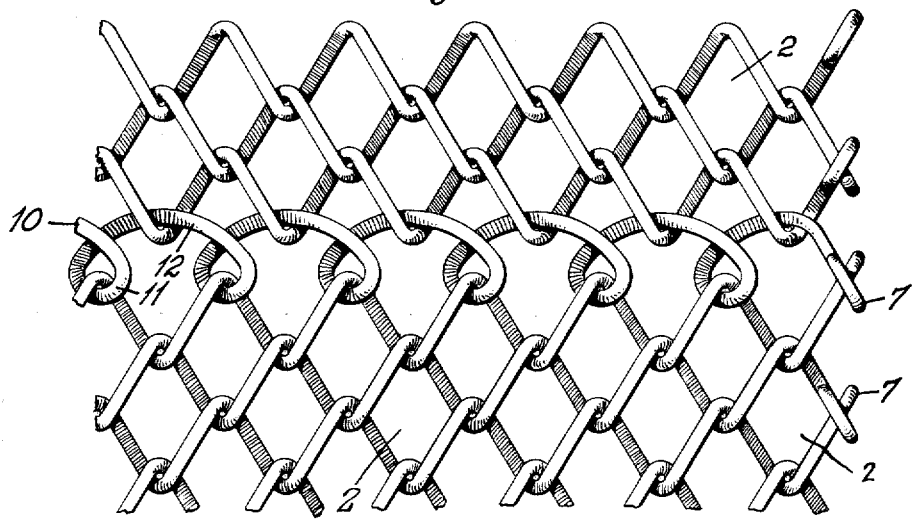
Fig. 2 is a similar view showing a different method of attaching the sections together.

In Figs. 1, 3, 4 and 5 of the drawing the numerals 2 indicate sections of woven wire fabric. These sections are woven from lengths of wire which are wound helically to form a series of flattened loops 3 which are interengaged and cooperate to produce diagonal surface ribs 4. It will be observed that the ribs 4 in the adjacent sections extend in opposite directions, this result being produced by coiling the wires of alternate sections in right-handed, flattened helixes and coiling the wires of the other alternate sections in left-handed, flattened helixes.

For the purpose of joining the sections 2 in edge-to-edge relation to each other, a connecting wire 5 is first bent into a succession of open loops 6. The loops on one side of this wire are shaped to engage only right-hand wound spirals, and the loops on the other side of this wire are shaped to engage only left-hand wound spirals. The connection between the wire 5 and the right and left sections is made in the manner described above, by weaving a right-hand coil through the end loops of the right-hand section and simultaneously through the proper set of loops of the wire 5, and by similarly weaving a left-hand coil through the end loops of the left-hand section and simultaneously through the remaining loops of the connecting wire 5. The ends of the mesh wires and of the connecting wires are all bent into closed loops 7, as is customary in fabrics of this type, so as to prevent the wires from becoming separated.

Figure 1:
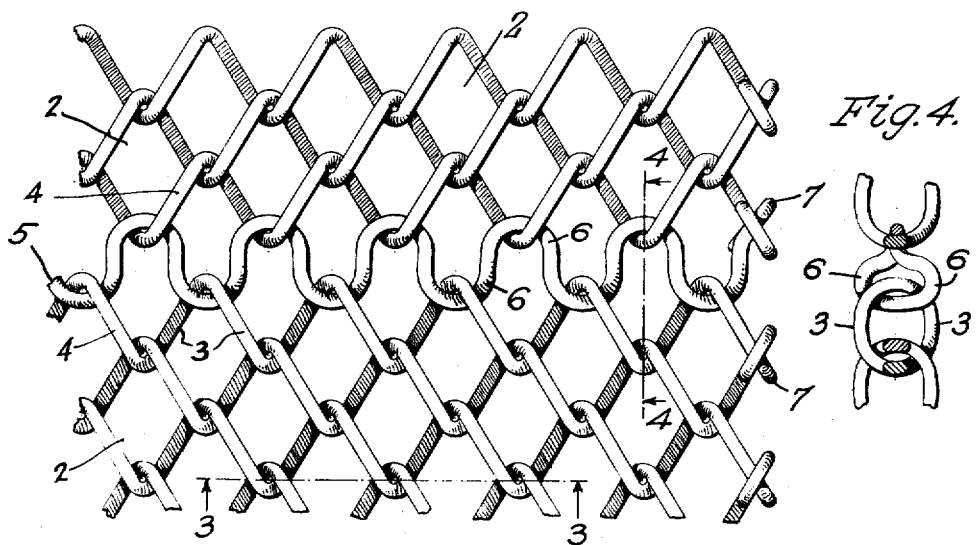
Figure 3:
Fig. 3 is a fragmentary section on the line 3—3, Fig. 1.
Figure 5:
Fig. 5 is a diagrammatic plan view showing a portion of the completed fabric.

Fig. 2 differs from Fig. 1 in the shape of the connecting wire. This connecting wire is indicated in Fig. 2 at 10 and is bent to form a succession of closed loops 11 which are properly shaped to interengage with all of the end loops of one of the sections. Between the closed loops 11 are longer open loops 12 which are properly shaped to interengage with all of the end loops of the other section. The form of connecting wire shown in Fig. 2 is assembled with the right and left sections in the same manner as is described above in connection with Fig. 1.

It will be observed that the loops of the adjacent sections are in alinement with one another lengthwise of the fabric, or vertically as seen in the accompanying drawing. The edges of the completed fabric are therefore accurately alined. It will also be observed that the joints between the sections do not materially alter the character of the fabric at these points, and that, therefore, the fabric can be employed in conveyor belts without any loss in efficiency due to the joints.

It will be observed from the drawing, particularly from Fig. 4, that the connecting wires which join the sections are so bent as to form a fabric unit having substantially the same effective thickness as the sections themselves. It will also be seen that the two series of loops in each connector are twisted to inclined positions which fit them to engage with the adjacent end loops of the sections in substantially the same way that the coils of the sections interengage with one one another. It will also be observed on the drawing that portions of the loops of the connecting wire that engage both sections are in substantial parallelism, which contributes to the production of a fabric having substantially the same characteristics at the joints as in the other portions of the fabric. These features contribute materially to making joints which have substantially the same characteristics as the remainder of the fabric.

While the joints described herein have been found to be well suited for the purposes described, various other methods may be employed for connecting the sections of the fabric, the principal requirements being that the sections be connected together without buckling or offsetting at the edges and without any tendency to stretch or fail at the joints between the sections when the fabric is subjected to tension.

As stated above, a conveyor belt composed of woven-wire fabric having its surface ribs all extending in the same direction has a marked tendency to creep toward one edge of the belt. This not only displaces the belt upon its supports but subjects the opposite edge of the belt to greater tension than the edge toward which the creepage takes place. Therefore, any stretching that may occur in the belt is distributed unevenly, and the free edge will eventually become substantially longer than the edge toward which the belt creeps, especially under conditions where the belt is subjected to considerable heat.

By alternating the sections as described above, so that any tendency of one section to creep laterally is offset by an equal tendency of the next section to creep in the opposite direction, I not only prevent substantial creepage in either direction, but also distribute the tension equally across the belt, with the result that the belt is more resistant to tension strains, and is therefore stronger in service, than a belt of the same wire and weave in which the surface ribs all extend in the same direction.

One useful application of the fabric described above is in conveyor belts for annealing leers. Examples of such leers, designed particularly for use in annealing glassware, are described and claimed in the Mulholland U. S. Patents No. 1,560,481 and No. 1,571,137, dated November 3, 1925, and Jan. 26, 1926, respectively, and in the Ingle U. S. Patent No. 1,583,046, dated May 4, 1926. In such a leer the conveyor is of considerable length and is moved slowly through zones of different temperatures, becoming highly heated during a portion of its travel and being cooled at other portions of its travel. It has been found that when a leer conveyor belt is composed of ordinary woven wire fabric, the diagonal ribs of the fabric give the belt a tendency to creep to one side as the belt advances upon its supports. As pointed out above, the present invention avoids such creepage by arranging the successive sections of the belt with the ribs extending alternately in different directions, so that the tendency to creep is neutralized. The flattening of the loops of which the fabric is composed gives the fabric a substantially flat surface which is well adapted to support bottles and other articles of glassware which should be carried upright through a leer.

My invention as described above contemplates dividing the fabric so that, when it is made into a belt, the lines of division extend transversely of the belt. A modified construction consists in dividing the fabric longitudinally and joining the two sections of right and left weave by means of one of the joints described above. This accomplishes much the same result as when the belt is divided transversely and the belt has only a single joint or seam extending lengthwise through its center. However, since such a long seam presents some practical difficulties in assembling the sections, I now prefer to divide the fabric transversely of the completed belt.

The fabric specifically shown and described herein is well suited for carrying out my invention, but it will be understood that various modifications may be adopted within the scope of the appended claims.

I claim as my invention:

1. A sectional woven wire fabric having unconfined outer edges and composed of sections woven from right-hand coils and other sections woven from left-hand coils, and connecting members each having means for engaging and holding the end coils of the adjacent sections in substantially the same space relation as the corresponding coils within each section, thereby connecting said sections so that their unconfined outer edges are in substantial alinement with one another.

2. A fabric for use in conveyor belts, comprising sections of wire fabric woven with diagonal ribs on their sufaces, the ribs on adjacent sections extending in different directions, and wires joining the adjacent edges of the said sections together in edge to edge relation, each of the said joining wires being bent into a succession of closed loops interengaging the end loops of one of the said sections, the said joining wire also having a succession of open loops between the said closed loops, and the said open loops extending through the end loops of the adjacent section of the fabric.

3. The method of making a woven wire fabric that comprises weaving a plurality of sections of wire fabric composed of coils having right-hand curvature, weaving a plurality of other sections having left-hand curvature, and joining said sections together, with the right and left sections alternating and with the side edges of all of said sections in alinement, by placing adjacent to the end of each successive section a connecting member having openings which are alternately adapted to interengage with the right and left wires respectively, weaving a wire similar to the wires of one of said sections through the loops of the end wire of said section and through the proper set of the openings of said connecting member, and then weaving a wire of opposite curvature through the loops of the end wire of the next section and through the remaining openings of said connecting member.

4. The method of making a woven wire fabric that comprises weaving a section of wire fabric composed of coils having right-hand curvature, weaving another section composed of coils having left-hand curvature, and joining said sections together by placing between the said sections a connecting wire bent in loops, some of which are adapted to interengage with the end loops of the right-hand woven section and others of which are adapted to interengage with the end loops of the left-hand woven section, weaving a wire similar to the wires of one of said sections through the loops of the end wire of said section and through the proper set of loops of the said connecting wire, and then weaving a wire of opposite curvature through the loops of the end wire of the other section and through the remaining loops of said connecting wire.

5. A joint for connecting sections of right-woven and left-woven wire fabric, comprising a connecting wire formed into sets of loops on opposite sides of said wire, the set of loops on one side of said connecting wire being interengaged with the loops of the end-wires of the right-woven section, and the set of loops on the other side of said connecting wire being interengaged with the loops of the end wires of the left-woven section.

6. A joint for connecting sections of right-woven and left-woven wire fabric, comprising a connecting wire formed into sets of loops on opposite sides of said wire, the set of loops on one side of said connecting wire being shaped to interengege with the loops of a right-coiled wire and the set of loops on the other side of said connecting wire being shaped to interengage with the loops of a left-coiled wire, and right and left coiled wires woven through said sets of loops of the connecting wire and through the end loops of said sections, the said coiled wires forming the end-wires of their respective sections.

Signed at New York, N. Y., this 24th day of January, 1925.

JOHN C. ANDERSON.

DISCLAIMER 1,691,507.—*John C. Anderson*, Keyport, N. J. WOVEN-WIRE FABRIC AND METHOD OF MAKING IT. Patent dated November 13, 1928. Disclaimer filed April 14, 1931, by the *patentee*.

Hereby enters this disclaimer to that part of the claims in said specification which is in the following words, to wit:

"1. A sectional woven wire fabric having unconfined outer edges and composed of sections woven from right-hand coils and other sections woven from left-hand coils, and connecting members each having means for engaging and holding the end coils of the adjacent sections in substantially the same space relation as the corresponding coils within each section, thereby connecting said sections so that their unconfined outer edges are in substantial alinement with one another."

"3. The method of making a woven wire fabric that comprises weaving a plurality of sections of wire fabric composed of coils having right-hand curvature, weaving a plurality of other sections having left-hand curvature, and joining said sections together, with the right and left sections alternating and with the side edges of all of said sections in alinement, by placing adjacent to the end of each successive section a connecting member having openings which are alternately adapted to interengage with the right and left wires respectively, weaving a wire similar to the wires of one of said sections through the loops of the end wire of said section and through the proper set of the openings of said connecting member, and then weaving a wire of opposite curvature through the loops of the end wire of the next section and through the remaining openings of said connecting member."

[*Official Gazette May 5, 1931.*]

necting wire being interengaged with the loops of the end wires of the left-woven section.

6. A joint for connecting sections of right-woven and left-woven wire fabric, comprising a connecting wire formed into sets of loops on opposite sides of said wire, the set of loops on one side of said connecting wire being shaped to interengege with the loops of a right-coiled wire and the set of loops on the other side of said connecting wire being shaped to interengage with the loops of a left-coiled wire, and right and left coiled wires woven through said sets of loops of the connecting wire and through the end loops of said sections, the said coiled wires forming the end-wires of their respective sections.

Signed at New York, N. Y., this 24th day of January, 1925.

JOHN C. ANDERSON.

DISCLAIMER 1,691,507.—*John C. Anderson*, Keyport, N. J. WOVEN-WIRE FABRIC AND METHOD OF MAKING IT. Patent dated November 13, 1928. Disclaimer filed April 14, 1931, by the *patentee*.

Hereby enters this disclaimer to that part of the claims in said specification which is in the following words, to wit:

"1. A sectional woven wire fabric having unconfined outer edges and composed of sections woven from right-hand coils and other sections woven from left-hand coils, and connecting members each having means for engaging and holding the end coils of the adjacent sections in substantially the same space relation as the corresponding coils within each section, thereby connecting said sections so that their unconfined outer edges are in substantial alinement with one another."

"3. The method of making a woven wire fabric that comprises weaving a plurality of sections of wire fabric composed of coils having right-hand curvature, weaving a plurality of other sections having left-hand curvature, and joining said sections together, with the right and left sections alternating and with the side edges of all of said sections in alinement, by placing adjacent to the end of each successive section a connecting member having openings which are alternately adapted to interengage with the right and left wires respectively, weaving a wire similar to the wires of one of said sections through the loops of the end wire of said section and through the proper set of the openings of said connecting member, and then weaving a wire of opposite curvature through the loops of the end wire of the next section and through the remaining openings of said connecting member."

[*Official Gazette May 5, 1931.*]